(12) United States Patent
Sabat et al.

(10) Patent No.: US 9,100,414 B2
(45) Date of Patent: *Aug. 4, 2015

(54) METHOD AND APPARATUS FOR PROVIDING A RELIABLE VOICE EXTENSIBLE MARKUP LANGUAGE SERVICE

(71) Applicant: AT&T Intellectual Property II, L.P., Atlanta, GA (US)

(72) Inventors: Ricardo Sabat, Monroe Township, NJ (US); Shankarnarayan Sivaprasad, Highland Park, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,278

(22) Filed: Nov. 4, 2013

(65) Prior Publication Data

US 2014/0056297 A1    Feb. 27, 2014

Related U.S. Application Data

(63) Continuation of application No. 11/444,883, filed on May 31, 2006, now Pat. No. 8,576,712.

(51) Int. Cl.
*H04L 12/66* (2006.01)
*H04L 12/56* (2006.01)
(Continued)

(52) U.S. Cl.
CPC ............ *H04L 65/1053* (2013.01); *H04L 65/80* (2013.01); *H04M 3/4938* (2013.01); *H04M 7/006* (2013.01)

(58) Field of Classification Search
CPC ................ H04L 47/10; H04L 65/1096; H04L 29/06278; H04M 3/4938
USPC ......... 370/352–356, 229–238, 395.2–395.21, 370/401, 493, 496; 379/220.01, 221.01, 379/221.03, 201.01, 154; 455/428, 445, 455/453; 709/239, 227–229, 206
See application file for complete search history.

(56) References Cited

U.S. PATENT DOCUMENTS 6,263,051 B1    7/2001    Saylor et al.
6,674,713 B1    1/2004    Berg et al.
(Continued)

FOREIGN PATENT DOCUMENTS

WO    WO-03/040942 A    5/2003

OTHER PUBLICATIONS

International Search Report and Written Opinion for PCT/US2007/069887.
(Continued)

*Primary Examiner* — Wutchung Chu

(57) ABSTRACT

A method and apparatus for providing a reliable Voice Extensible Markup Language (VXML) over packet networks such as Voice over Internet Protocol (VoIP) and Service over Internet Protocol (SoIP) network are disclosed. For example, a service provider may utilize a plurality of content servers that can be accessed by at least one telephony browser. The telephony browser can reach the content browsers directly as well as through a shared server that may load balance among the content servers. When a request for a VXML content, e.g., a VXML application, is received, the telephony browser sends the request to the shared server. If the request fails or a response is not received prior to expiration of a predetermined time interval, then the telephony browser sends a second request directly to one of the content servers that is capable of providing the requested content.

20 Claims, 4 Drawing Sheets

(51) Int. Cl.
*H04L 29/00* (2006.01)
*H04M 7/00* (2006.01)
*H04Q 7/20* (2006.01)
*H04W 72/04* (2009.01)
*H04W 28/08* (2009.01)
*G06F 9/455* (2006.01)
*H04L 29/06* (2006.01)
*H04M 3/493* (2006.01)

(56) References Cited

U.S. PATENT DOCUMENTS

| | | | |
|---|---|---|---|
| 6,937,715 | B2 | 8/2005 | Delaney |
| 7,321,925 | B2* | 1/2008 | Trethewey .................... 709/219 |
| 7,412,525 | B2* | 8/2008 | Cafarella et al. ............. 709/229 |
| 7,568,038 | B1 | 7/2009 | Ezerzer et al. |
| 7,617,309 | B2 | 11/2009 | Yoshida et al. |
| 8,243,598 | B2 | 8/2012 | Battestilli et al. |
| 8,248,928 | B1 | 8/2012 | Wang et al. |
| 8,260,757 | B1* | 9/2012 | Chatterjee et al. ........... 707/703 |
| 8,427,956 | B1* | 4/2013 | Thai et al. .................... 370/236 |
| 8,576,712 | B2 | 11/2013 | Sabat et al. |
| 2001/0036176 | A1 | 11/2001 | Girard |
| 2002/0133532 | A1* | 9/2002 | Hossain ........................ 709/105 |
| 2003/0051037 | A1* | 3/2003 | Sundaram et al. ............ 709/227 |
| 2003/0083882 | A1 | 5/2003 | Schemers, III et al. |
| 2003/0118004 | A1* | 6/2003 | Pan ............................... 370/352 |
| 2004/0024881 | A1 | 2/2004 | Elving et al. |
| 2004/0054796 | A1* | 3/2004 | Kikuchi et al. ............... 709/229 |
| 2004/0059777 | A1 | 3/2004 | Palazzo et al. |
| 2004/0071087 | A1* | 4/2004 | Siev et al. .................... 370/235 |
| 2004/0103194 | A1* | 5/2004 | Islam et al. ................... 709/225 |
| 2004/0260745 | A1* | 12/2004 | Gage et al. .................... 709/200 |
| 2005/0102400 | A1* | 5/2005 | Nakahara et al. ............. 709/225 |
| 2006/0221815 | A1 | 10/2006 | Matsumoto |
| 2006/0239196 | A1* | 10/2006 | Khanna et al. ................ 370/235 |
| 2007/0143128 | A1 | 6/2007 | Tokarev et al. |
| 2007/0150586 | A1* | 6/2007 | Kilian et al. .................. 709/224 |
| 2008/0313274 | A1 | 12/2008 | Murray et al. |
| 2009/0019158 | A1 | 1/2009 | Langen et al. |
| 2009/0055552 | A1 | 2/2009 | Swildens |
| 2009/0313273 | A1 | 12/2009 | Wexler et al. |
| 2011/0213882 | A1* | 9/2011 | Swildens et al. .............. 709/225 |

OTHER PUBLICATIONS

Examination Report for EP 07 797 842.7, Jan. 29, 2010, consists of 4 pages.

* cited by examiner

METHOD AND APPARATUS FOR PROVIDING A RELIABLE VOICE EXTENSIBLE MARKUP LANGUAGE SERVICE

This application is a continuation of U.S. patent application Ser. No. 11/444,883, filed May 31, 2006, now U.S. Pat. No. 8,576,712 B2, and is herein incorporated by reference in its entirety.

BACKGROUND OF THE INVENTION

The Internet has emerged as a critical communication infrastructure, carrying traffic for a wide range of important applications. Internet services such as VoIP and SoIP services are becoming ubiquitous. Businesses are expanding and adding new services and products based on expansions and improvements of the communications network. Prior to Internet based telephony applications, deployment of phone features other than the basic call setup required multiple levels of hardware and software to be maintained by businesses. For example, businesses owned switches for interoffice Private Branch Exchange (PBX) purposes. Voice Extensible Markup Language (VXML), a language that enables telephony applications to be developed easily and quickly similar to web pages, was created. When callers dial a number, a media server (e.g., a telephony browser) terminates the call and associates the dialed number with a VXML application. The telephony browser then contacts the content server where the VXML application resides, obtains the desired information, and interacts with the caller to provide the content in a format compatible with the receiving device. However, when the telephony browser attempts to contact the content server, the telephony browser may not receive a response from the content server in a timely manner due to network conditions. Some examples of network conditions are failure, congestion, delay in automatic re-routing, etc. Calls may fail to complete during the time it takes to self-heal a content server, thereby resulting in lost calls that lower the overall reliability of the platform.

Therefore, there is a need for a method that enables a network service provider to provide a reliable VXML service.

SUMMARY OF THE INVENTION

In one embodiment, the present invention discloses a method and apparatus for providing a reliable Voice Extensible Markup Language (VXML) service on packet networks such as Voice over Internet Protocol (VoIP) and Service over Internet Protocol (SoIP) networks. For example, the method enables a service provider to utilize a plurality of content servers. The service provider enables each telephony browser to reach the content browsers directly as well as through a shared server, e.g., a multi Uniform Resource Locator (URL) server, that may load balance among the content servers. When a request for a VXML content, e.g., a VXML application, is received, the telephony browser sends the request to the shared server. If the request fails or a response is not received prior to expiration of a predetermined time interval, then the telephony browser sends a second request directly to one of the content servers that is capable of providing the requested content. If the second request also fails, then a third request is sent to another content server with the content, and so on until all content servers are attempted. If all attempts to reach one of the content servers fail or timeout, then a courtesy message is played to the caller. In another embodiment, the call may also be transferred to a call center for handling.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a reliable Voice Extensible Markup Language (VXML) service on networks such as the packet networks Voice over Internet Protocol (VoIP) and Service over Internet Protocol (SoIP). Although the present invention is discussed below in the context of VoIP and SoIP networks, the present invention is not so limited. Namely, the present invention can be applied for services on other networks such as a wireless network.

Figure 1:
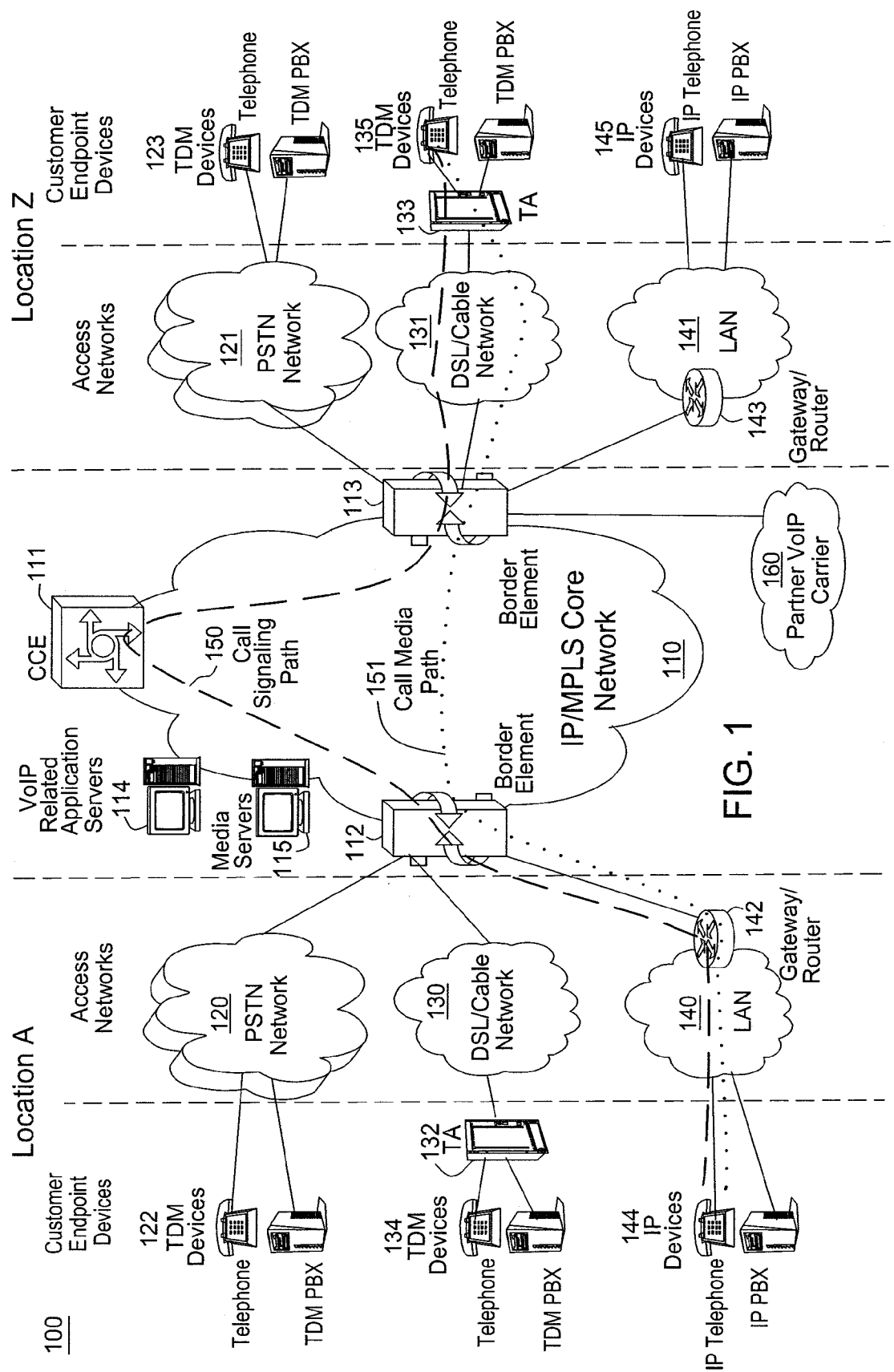
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported and services are provided over communications networks. Businesses are expanding and adding new services and products based on expansions and improvements of the communications network. The traditional telephone network was optimized for basic call setup and completion between two locations. Deployment of phone features other than the basic call required multiple levels of hardware and software, some maintained by calling parties and others by called parties. For example, businesses owned switches for interoffice Private Branch Exchange (PBX) purposes. In another example, a business engaging in interaction with customers via a voice response system would need to maintain hardware and software for those applications. In the Internet era, network service providers offer alternatives by developing telephony applications based on Standard Generalized Markup Language (SGML) and making them available to enterprise customers. However, users of the traditional telephone network are accustomed to having their calls complete with one attempt. Therefore, there is a need to increase the reliability of web based telephony applications to be on par with or better than the traditional telephone networks. In one embodiment, the current invention discloses a method and apparatus for providing reliable VXML services on networks such as VoIP or SoIP networks. In order to clearly illustrate the teachings of the current invention, the following terminologies and networking concepts will first be described:

Metadata;
Metalanguage;
Extensible Markup Language (XML);
Voice Extensible Markup Language (VXML);
Content server; and
Telephony browser.

Metadata refers to a definition or description of data. Metalanguage refers to a description of language. The Standard Generalized Markup Language (SGML) refers to a metalanguage that describes the structure for documents including items such as headings, paragraphs, etc. For example, Hyper Text Markup Language (HTML) is a specific type of SGML used for building web pages.

An Extensible Markup Language (XML) refers to a metalanguage for describing and providing rules for a collection of data. It is modeled after SGML.

Voice Extensible Markup Language (VXML) refers to a type of SGML used for building telephony applications. VXML enables telephony applications to be developed easily and quickly similar to web pages. It is structured like HTML but uses an auditory medium to enable users to use voice commands for navigation. For example, a caller may be asked to select from a menu of choices using his/her own voice. Based on the caller's input, the content to be provided may be selected.

Content server refers to a server or a site where the VXML application resides. For example, if the network service provider is providing a VXML service to an enterprise customer, e.g., a bank, the content server is responsible for fetching the requested information from a database and providing the information to the customer via the telephony browser as defined below. For example, the bank may keep a real time database pertaining to its customers such as account balance information, payment information, loan information and the like. The content server would then be responsible for accessing the information and providing the information to the telephony browser.

In one embodiment, the content server may be attached to a multi Uniform Resource Locator (URL) server for load balancing. In that case, the load balancer is a multi-URL site. For example, an enterprise may have multiple locations that may provide content equally. Any request can be sent to an available server by the multi URL server. The VXML application is the program that would retrieve the information from the database. Note that depending on the application, the database may be located in the service provider's network or the enterprise network. For example, an enterprise customer may choose to upload the data to the content server on a periodic basis.

In one embodiment, telephony browser is a media server that typically handles and terminates telephone calls. It also provides services such as announcements, bridges and Interactive Voice Response (IVR) messages for VoIP service applications. The media server may also interact with customers for media session management to accomplish tasks such as process requests. For example, the telephony browser may keep a list of IP addresses for VXML contents and provides specific phone numbers for each of the VXML contents. When the telephony browser receives a call addressed to VXML content, the telephony browser associates the dialed number with the IP address of the VXML content and sends the call to the content server as defined above.

However, when the telephony browser attempts to contact the content server, the telephony browser may not receive a response from the content server in a timely manner due to network conditions. Some examples of network conditions include, but are not limited to, a failure, congestion in the network, a delay in automatic re-routing, etc. As such, calls may fail to complete during the time it takes to self-heal a content server, thereby resulting in lost calls that lower the overall reliability of the platform. The current invention provides a method that enables the network service provider to provide a more reliable VXML service.

Figure 2:
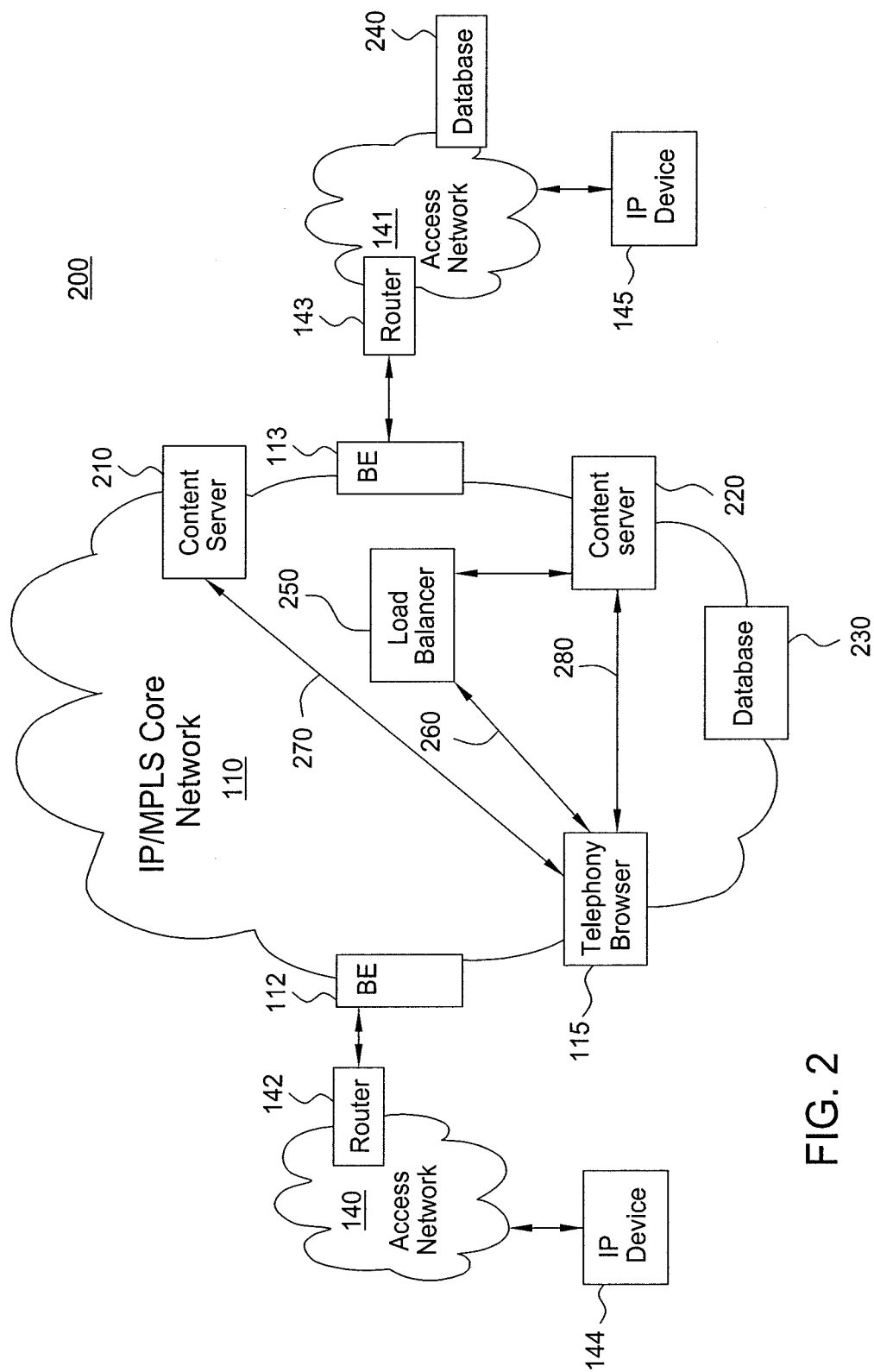
FIG. 2 illustrates an exemplary network with one embodiment of the present invention for providing a reliable VXML service.

FIG. 2 illustrates an exemplary network 200 with one embodiment of the present invention for providing a reliable VXML service. For example, a customer may use an IP device 144 to access the IP services such as VoIP and SoIP services. IP device 144 is connected to an access network 140. The access network 140 contains a gateway router 142. The gateway router 142 is connected to an IP/MPLS core network 110 through a border element 112.

In one embodiment, an enterprise customer may use an IP device 145 to access VXML services. IP device 145 is connected to an access network 141. The access network 141 contains a gateway router 143. The gateway router 143 is connected to the IP/MPLS core network 110 through a border element 113.

In one embodiment, one or more telephony browser 115 (e.g., a media server for telephone applications) is deployed in the IP/MPLS core network 110. In one embodiment, the service provider may utilize a plurality of servers, e.g., servers 210 and 220 to provide VXML content service to the enterprise customer.

In one embodiment, server 250 is used as a front-end device for load balancing among the content servers 210 and 220. Server 250 may also be referred to as a multi-URL server. To illustrate, the telephony browser 115 is connected directly via path 270 to the content server 210. It is also connected directly via path 280 to the content server 220. However, the path 260 also connects the telephony browser 115 to the load balancer 250. Thus, the load balancer can serve as the front-end server for both content servers 210 and 220.

Database 230 in the IP/MPLS core network is used for storing data for enterprise customers who provided the data to be accessed by a VXML service supported by the network service provider. For example, database 230 may contain customer information belong to an enterprise customer (e.g., a bank) of the network service provider. Note that the data may be uploaded to database 230 on a periodic basis by the enterprise customer. Furthermore, although the database 230 is illustrated as being a standalone module, it is not so limited.

For example, it can be implemented within one or more of the content servers or within another application server.

However, an enterprise customer may elect to maintain the database locally and only make the data available for retrieval by the network service provider when needed. As such, database 240 is located in the enterprise customer network to be maintained by the enterprise customer.

In one embodiment, when a request for a VXML service is received from end device 144, the telephony browser 115 first sends the request to the multi URL server 250. The server 250 enables a load balancing function to be performed among the servers 210 and 220, i.e., selecting one of the content server to service the request. If the first request fails or a response is not received prior to expiration of a predetermined time interval, then the telephony browser 115 will send a second request directly to either server 210 or 220, thereby bypassing the load balancing server 250. If the second request also fails, then a third request is sent to the other server that did not receive the second request. If all three attempts to reach one of the content servers fail or timeout, then the telephony browser 115 will play a courtesy message to the caller. In another embodiment, the call may also be transferred to a call center.

The above network example is not intended to limit the implementation of the present invention. Note that only the network elements used to describe the present invention are illustrated in FIG. 2. It is not intended to show all network elements in the core network. It should be noted that although FIG. 2 illustrates only two content servers and one telephony browser, the present invention is not so limited. Namely, any number of content servers and telephony browsers can be deployed within the core network 110. For example, the service provider may determine the number of content servers and/or telephony browsers that will be needed to support a particular reliability level.

Figure 3:
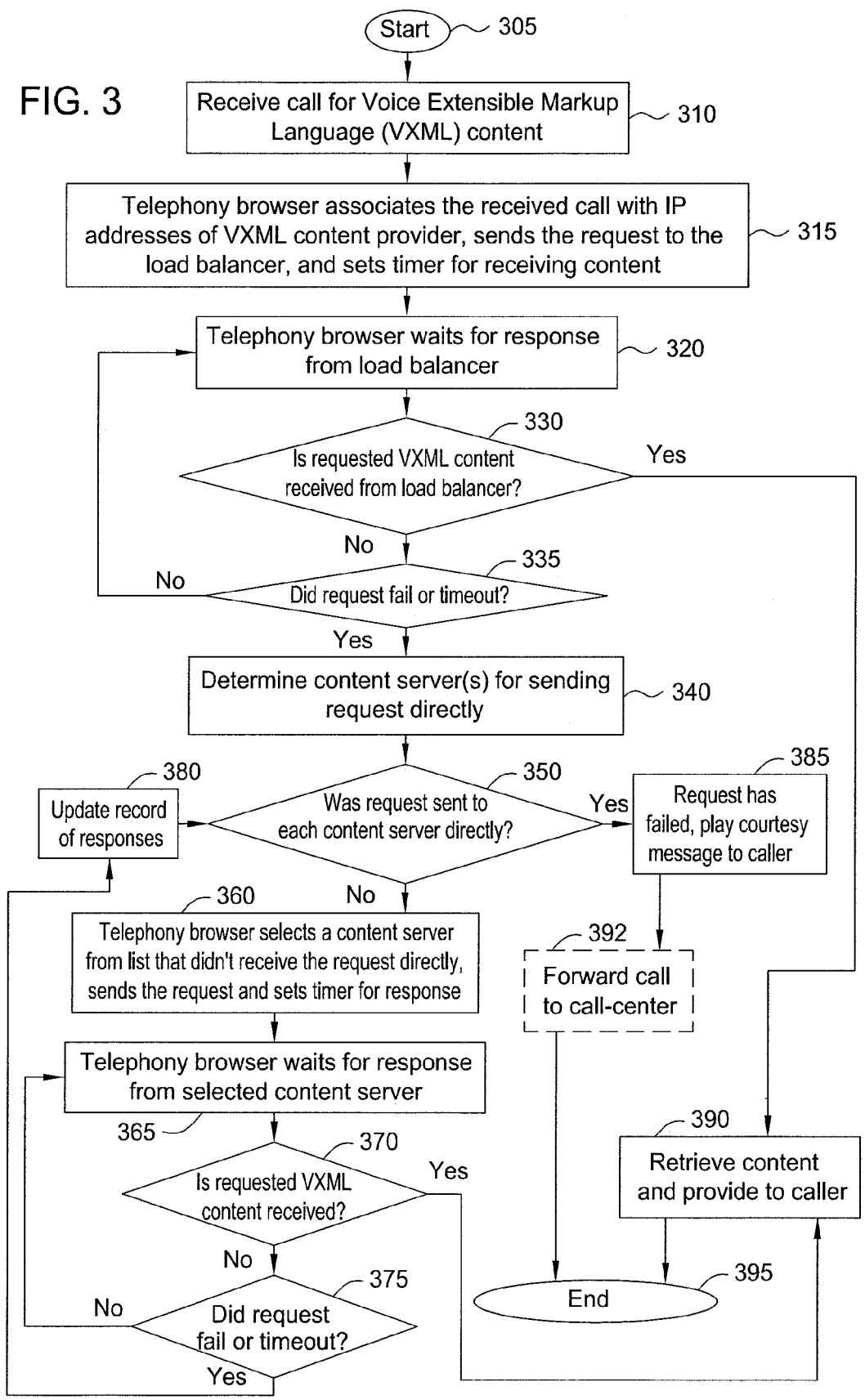
FIG. 3 illustrates a flowchart of a method for providing a reliable VXML service.

FIG. 3 illustrates a flowchart of one embodiment of a method 300 for providing a reliable VXML service. Namely, a service provider may implement method 300 to provide a plurality of content servers for accessing VXML applications and for providing the information to a telephony browser.

Method 300 starts in step 305 and proceeds to step 310. In step 310, method 300 receives a call request for VXML content. For example, a telephony browser receives a call to a telephone number that is associated with VXML content. The service provider may assign a number, e.g., 1-800-nnn-nnnn, as the number to reach a specific VXML content.

In step 315, telephony browser associates the received call with one or more IP addresses of a content provider, sends the request to a load balancer and sets a timer for receiving a response. For example, the telephony browser identifies a list of valid URLs for the content and sends the information to the load balancer. Many enterprise customers may have multiple servers to ensure reliability, where any one of the deployed servers is capable of serving the request of the caller.

In step 320, the telephony browser waits for a response from the load balancer. The load balancer determines which content server is better suited to provide the service and sends the request to one of the available content servers. For example, the request may be sent to a lightly loaded content server by a multi URL server functioning as the load balancer. Note that the request is sent to only one of the content servers as a normal process.

In step 330, method 300 determines whether or not the requested VXML content is received via the load balancer. If the content is received, then the method proceeds to step 390 to provide the content to the caller. For example, the telephony browser plays a message in a format compatible with the receiving device the caller is using. If the content is not received, then the method proceeds to step 335 to determine whether or not the request was successful.

In step 335, method 300 determines whether or not the request failed or timed out. If the request did not fail or timeout, the method returns to step 320, and continues to wait for a response. If the request has failed or timed out, then the method proceeds to step 340 to proceed with sending a request to another content server directly.

In step 340, method 300 determines a list of content servers or a group of content servers (e.g., a virtual IP or a URL) for sending the request directly. For example, the network service provider may provide two content servers for reaching the VXML application contents. Note that the telephony browser keeps track of which content servers it has attempted to contact directly as shown below in step 380. The method then proceeds to step 350.

In step 350, method 300 determines whether the request has been sent to each content server directly. For example, if there are two content servers, method 300 determines whether the request has been sent to both servers directly after the request through the load balancer has failed or timed out. If the request has already been sent to each content server directly, then the method proceeds to step 385 to play a courtesy message to the caller to let the caller know that the requested content could not be delivered. Otherwise, the method proceeds to step 360, to select another content server from the list.

In step 360, the telephony browser selects a content server from the list of servers that did not previously receive the request directly, sends the request and sets a timer for receiving a response. For the above example, if the first content server has been tried previously, then the second content server is selected, a new timer is set and the request is sent directly to the second content server.

In step 365, the telephony browser waits for a response from the selected content server. For the above example, the telephony browser waits for a response from the second content server.

In step 370, method 300 determines whether or not the requested VXML content is received from the content server. If the response is received, then the method proceeds to step 390 to provide the content to the caller. Otherwise, the method proceeds to step 375 to determine whether or not the request has failed or timed out.

In step 375, method 300 determines whether or not the request has failed or timed out. If the request has timed out or failed, then the method proceeds to step 380 to update the record of responses. If the request did not time out and did not fail, then the method proceeds to step 365 to continue waiting for a response.

In step 380, method 300 updates the record of responses from the content servers. The updated record is used to determine which content servers have not been directly contacted. The next attempt is made to one of the content servers that did not receive any of the previous directly sent requests. The method then proceeds to step 350 to determine whether or not all content servers have been tried.

In step 385, method 300 determines that the request has failed and plays a courtesy message to the caller. In one embodiment, the method may optionally proceed to step 392 to forward the call to a call-center (e.g., a live agent) for assistance. The method then proceeds to step 395 to end processing the current request.

In step 390, method 300 retrieves the requested VXML content and provides the content to the caller in a format compatible with user's device. The method then proceeds to step 395 to end processing the current request.

Figure 4:
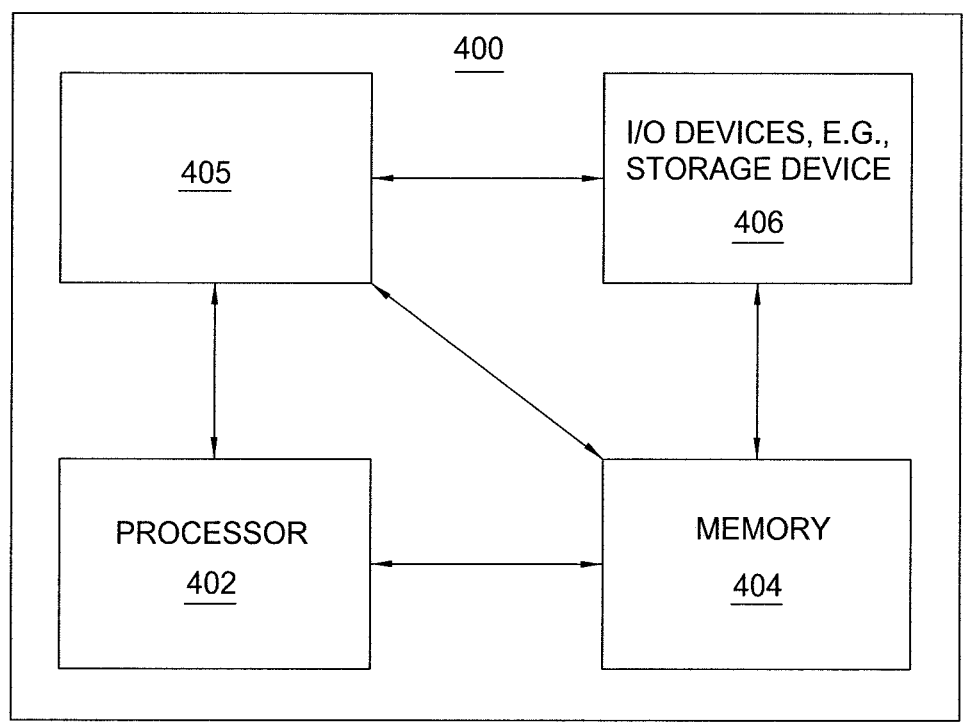
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a reliable voice extensible markup language service, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing a reliable voice extensible markup language service can be loaded into memory 404 and executed by processor 402 to implement the functions as discussed above. As such, the present method 405 for providing a reliable voice extensible markup language service (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a call request in a communication network, comprising:

receiving, by a processor of a telephony browser, the call request requiring a voice markup content, wherein the voice markup content is a voice extensible markup language content;

forwarding, by the processor, the call request to a load balancer, where the load balancer is coupled to a plurality of content servers;

forwarding, by the processor, the call request directly to one of the plurality of content servers when a timer has expired without receiving a response from the load balancer after the call request was forwarded to the load balancer;

forwarding, by the processor, the call request to a call center after all of the plurality of content servers have been contacted directly without success in providing the voice markup content; and playing, by the processor, a message indicating a failure to obtain the voice markup content after all of the plurality of content servers have been contacted directly.

2. The method of claim 1, wherein the communication network is an internet protocol network.

3. The method of claim 1, wherein the load balancer is implemented in a multi uniform resource locator server.

4. The method of claim 1, wherein a list of the plurality of content servers is maintained by the telephony browser.

5. The method of claim 1, wherein the call request is forwarded directly to the one of the plurality of content servers via a virtual internet protocol address.

6. The method of claim 1, wherein the call request is forwarded directly to the one of the plurality of content servers via a uniform resource locator address.

7. The method of claim 1, wherein the call request is associated with a toll free number.

8. A non-transitory computer-readable medium storing a plurality of instructions which, when executed by a processor of a telephony browser, cause the processor to perform operations for processing a call request in a communication network, the operations comprising:
   receiving the call request requiring a voice markup content, wherein the voice markup content is a voice extensible markup language content;
   forwarding the call request to a load balancer, where the load balancer is coupled to a plurality of content servers;
   forwarding the call request directly to one of the plurality of content servers when a timer has expired without receiving a response from the load balancer after the call request was forwarded to the load balancer;
   forwarding the call request to a call center after all of the plurality of content servers have been contacted directly without success in providing the voice markup content; and
   playing a message indicating a failure to obtain the voice markup content after all of the plurality of content servers have been contacted directly.

9. The non-transitory computer-readable medium of claim 8, wherein the communication network is an internet protocol network.

10. The non-transitory computer-readable medium of claim 8, wherein the load balancer is implemented in a multi uniform resource locator server.

11. The non-transitory computer-readable medium of claim 8, wherein a list of the plurality of content servers is maintained by the telephony browser.

12. The non-transitory computer-readable medium of claim 8, wherein the call request is forwarded directly to the one of the plurality of content servers via a virtual internet protocol address.

13. The non-transitory computer-readable medium of claim 8, wherein the call request is forwarded directly to the one of the plurality of content servers via a uniform resource locator address.

14. The non-transitory computer-readable medium of claim 8, wherein the call request is associated with a toll free number.

15. An apparatus for processing a call request in a communication network, comprising:
   a processor of a telephony browser; and
   a computer-readable medium storing a plurality of instructions which, when executed by the processor, cause the processor to perform operations, the operations comprising:
      receiving the call request requiring a voice markup content, wherein the voice markup content is a voice extensible markup language content;
      forwarding the call request to a load balancer, where the load balancer is coupled to a plurality of content servers;
      forwarding the call request directly to one of the plurality of content servers when a timer has expired without receiving a response from the load balancer after the call request was forwarded to the load balancer;
      forwarding the call request to a call center after all of the plurality of content servers have been contacted directly without success in providing the voice markup content; and
      playing a courtesy message indicating a failure to obtain the voice markup content after all of the plurality of content servers have been contacted directly.

16. The apparatus of claim 15, wherein the communication network is an Internet protocol network.

17. The apparatus of claim 15, wherein the load balancer is implemented in a multi uniform resource locator server.

18. The apparatus of claim 15, wherein a list of the plurality of content servers is maintained by the telephony browser.

19. The apparatus of claim 15, wherein the call request is forwarded directly to the one of the plurality of content servers via a virtual internet protocol address.

20. The apparatus of claim 15, wherein the call request is forwarded directly to the one of the plurality of content servers via a uniform resource locator address.

* * * * *